United States Patent Office 3,475,394
Patented Oct. 28, 1969

3,475,394
PROCESS FOR POLYMERIZING α-OLEFINS AND POLYMERIZATION CATALYST THEREFOR CONTAINING AN ORGANOALUMINUM SULFATE
Kiichiro Matsumura, Yoshio Sugawara, Tadami Kamaishi, and Yuji Atarashi, Ohtsu-shi, Japan, assignors to Toyo Rayon Kabushiki Kaisha, Tokyo, Japan, a corporation of Japan
No Drawing. Filed Oct. 18, 1965, Ser. No. 497,483
Claims priority, application Japan, Oct. 21, 1964, 39/59,480; Dec. 1, 1964, 39/67,229
Int. Cl. C08f 1/42
U.S. Cl. 260—88.2    7 Claims

ABSTRACT OF THE DISCLOSURE

A process for polymerizing α-olefins in the presence of a novel catalyst composition and such novel catalyst composition per se comprising a halide or oxyhalide of a transition metal of Groups IV–A to VI–A of the periodic table and an organoaluminum compound of the formula $R_4Al_2SO_4$ wherein R is a hydrocarbon of 1–15 carbon atoms. The catalyst employed can additionally contain a promoter.

---

The invention relates to a new alpha-olefin polymerization catalyst as well as to a process for polymerizing alpha-olefins by means of said catalyst.

More particularly, the invention relates to a new alpha-olefin polymerization catalyst which contains as its principal catalyst a catalyst composition obtained by mixing (1) Halides (preferably chlorides) or oxyhalides (preferably oxychlorides) of transition metals of Groups IV–A and VI–A of the periodic table (preferably Ti or V); with
(2) Organoaluminum compounds of the formula $$R_4Al_2SO_4$$

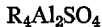

where R is a hydrocarbon radical of 1–15 carbons, which may be the same or different, and is preferably one of either the alkyl, aryl or aralkyl radicals, particularly to be preferred being $C_1$–$C_8$ alkyl groups, inter alia the lower alkyl groups;

and to an alpha-olefin polymerization catalyst which comprises said principal catalyst to which have been added promoters, if necessary. The invention also relates to a process for polymerizing alpha-olefins in which alpha-olefins (inclusive of, e.g., homopolymerization, copolymerization and block polymerization) are polymerized in the presence of a small amount of the foregoing catalyst.

A great number of compositions have been proposed as catalysts for use in polymerizing alpha-olefins such as ethylene, propylene, butene-1, etc. Of these catalyst compositions, one which is typical is that consisting of a titanium halide such as titanium trichloride or tetrachloride, and an organoaluminum compound such as triethylaluminum or diethylaluminum chloride. It is also known that highly crystalline polymers of alpha-olefins can be obtained by using such a catalyst system.

As a result of our researches concerning processes for polymerizing alpha-olefins to solid polymers, we found that highly crystalline alpha-olefin polymers, suitable for the manufacture of, for example, textile fibers, films and other shaped articles, could be prepared commercially with advantage by using catalyst compositions prepared by mixing a first component, the halide or oxyhalide of (1), above, with a second component of the formula $R_4Al_2SO_4$ of (2), above, a component which has not been proposed in the Ziegler catalyst; or a catalyst system comprising the foregoing catalyst compositions in which have been incorporated, if necessary, promoters as a third component.

The component having the foregoing formula $R_4Al_2SO_4$, which is used as the second component in the present invention, has the advantage that it is easily handled because of its low volatility and good activity as compared with the second component proposed in the Ziegler catalyst. In addition, the use in a small amount will suffice also for a third component which can be added, as needed, to the principal catalyst that is obtained by mixing the first and the second components of the catalyst according to this invention. Further, there is also the merit that the molecular weight of the resulting polymer is controlled much more easily when polymers are prepared using the said catalyst. Furthermore, there are no defects such as high ignitability which is observed in the case of the second components of the Ziegler catalyst, i.e., the organoaluminum compounds, e.g., trialkylaluminum and alkylaluminum halides.

It is therefore an object of the present invention to provide a process for polymerizing many kinds of alpha-olefins using a new catalyst composition in which a promoter can be incorporated if necessary.

Another object of the invention is to provide a new alpha-olefin polymerization catalyst by disclosing the principal catalyst, which can be used alone or with the promoters which can be added to the above-mentioned principal catalyst, if necessary.

Other objects and advantages of the present invention will become apparent from the following description.

The catalyst according to this invention will be fully described.

The principal catalyst which can be used alone in the invention is one which is obtained by mixing the first component of (1), above, and the second component of (2), above. The first components, the transition metals of Groups IV–A and VI–A of the periodic table, include Ti, Zr, V, Cr, Mo, etc., of which titanium and vanadium are most suitable. And as the halides or oxyhalides of these metals the bromides, iodides, etc. are used, but particularly preferred are the chlorides and oxychlorides. Specific examples of the first component include, e.g., zirconium tetrachloride, chromium trichloride, molybdenum pentachloride, titanium dichloride, titanium trichloride, titanium tetrachloride, vanadium trichloride, vanadium tetrachloride, vanadium oxydichloride (vanadyl dichloride), and vanadium oxytrichloride (vanadyl trichloride). In polymerizing propylene and the alpha-olefins higher than that, titanium trichloride is especially convenient.

Titanium trichloride can be obtained by the reduction of titanium tetrachloride with, for example, hydrogen or metals such as Al, Zn, Sb and Cu. Titanium trichloride can also be obtained by such means as reacting titanium tetrachloride with an organoaluminum compound, which is used as the aforesaid second component in the present invention, or other alkyl aluminum compounds, or also by the pyrolysis of alkyl titanium trichloride.

Further, the titanium trichloride may be used after the various known activation treatments. As such a treatment, mention can be made of, for example, the treatment of grinding the titanium trichloride physically by means of ball mill.

The organoaluminum compound which is used as the second component of the catalyst used in the process and which is an important feature of the present invention has the formula $$R_4Al_2SO_4$$

where R is a hydrocarbon radical of 1–15 carbon atoms, which may be the same or different. It is preferred that such hydrocarbon radical is one of the alkyl, aryl and aralkyl groups. It may be a different radical belonging to the the same alkyl groups, such as, for example, methyl or ethyl. On the other hand, it may be a different radical, such as an alkyl radical and an aryl radicals. It is preferred that R are the same or different alkyl radicals of 1–8 carbon atoms, and especially lower alkyl radicals.

As such as organoaluminum compound, included are bis(dimethylaluminum)sulfate, bis(diethylaluminum) sulfate, dimenthylaluminum(diethylaluminum sulfate, di-n-propylaluminum-diisopropylaluminum sulfate, bis-(di-n-butylaluminum) sulfate, bis(didodecylaluminum) sulfate, bisdiphenylaluminum) sulfate, bis(dibenzylaluminum) sulfate and dibenzylaluminum-diphenylaluminum sulfate. Bis(diethylaluminum) sulfate is particularly desirable.

These organoaluminum compounds, the second component of the catalyst system, associate bimolecularly under certain conditions. Needless to say, these associated types are also comprehended as the said second component in this invention. The bis(dialkylaluminum)sulfate used as the second component of the catalyst, can be obtained by reacting an organoaluminum halide with an organic ester of sulfuric acid, in accordance with the process disclosed in U.S. Patent 2,969,383.

We have discovered a new process of obtaining the intended bis(dialkylaluminum)sulfate, whereby it is possible not only to synthesize the bis(dialkylaluminum) sulfate with a simpler procedure but at a much lower cost as well. According to this process, a dialkylaluminum halide is reacted with an alkali metal salt, a zinc salt or a calcium salt of sulfuric acid to yield readily the corresponding bis(dialkylaluminum)sulfate.

The metal salts of sulfuric acid used here include, e.g., lithium sulfate, sodium sulfate, potassium sulfate, rubidium sulfate, cesium sulfate, zinc sulfate and calcium sulfate, of which the lithium, sodium and potassium salts of sulfuric acid are especially suitable. They may be used either singly or as a mixture of two or more salts. These salts must be dried before use in order to obtain good yield of bis(dialkylaluminum)sulfate.

On the other hand, the other reactant, the dialkylaluminum halide, is a compound having an alkyl radical of 1–15 carbon atoms. Examples include dimethylaluminum chloride, diethylaluminum iodide, diisopropylaluminum bromide, di-n-hexylaluminum chloride, diphenylaluminum chloride and dibenzylaluminum chloride. These dialkylaluminum halides may be used either singly or as mixtures of two or more components. In addition, they may also be used with the monoalkylaluminum dihalides, and hence it is also possible to use the corresponding sesquihaides instead of these dialkylaluminum.

The new process for preparing this catalyst consists of replacing the halogen atom attached to the aluminum with a sulfate radical, and any process which promotes this substitution reaction promptly can be employed. For example, a process of synthesis where in a solvent is used may be used, or it is also possible to carry out a direct reaction between a crude alkylaluminum halide and a metal salt of sulfuric acid. When a solvent is used, hydrocarbons and chlorinated hydrocarbons are used as a solvent.

Typical examples of the solvents are saturated aliphatic hydrocarbons such as pentane, hexane, heptane, octane and decane: the cycloaliphantic hydrocarbons such as cyclohexane, methyl cyclohexane and decahydronaphthalene: the aromatic hydrocarbons such as benzene, toluene, xylene, ethylbenzene: the aromatic chlorinated hydrocarbons such as chlorobenze, o-dichlorobenzene and alpha-chloronaphthalene. In addition, the hydrocarbon mixtures such as kerosene, petroleum benzine, ligroin, petroleum ether and liquid paraffin are also suitable. In all cases, it is preferred that the solvent be dehydrated and purified before use. While there is no particular restriction as to the reaction temperature required for the synthesis so long as it is below the decomposing temperature of alkylaluminum, the synthesis can be carried out at a high yield particularly at a temperature ranging between 130° C. and 200° C.

Thus, by this new process the bis(dialkylaluminum) sulfate is readily synthesized in good yield as well as at low cost.

The second component of the catalyst in this invention, which is obtained either by the conventional processes or by the new process hereinabove described, is a white powder at room temperature, which readily dissolves in hydrocarbon solvents. Further, this component does not possess high ignitability which the second component of the hitherto-proposed Ziegler catalyst, such as trialkylaluminum and dialkylaluminum chloride, has.

The catalyst obtained by mixing the two components the first and the second components can be used without any treatment or after isolation and collection of the solid substance formed by the reaction.

The resulting two-component catalyst, when used alone, exhibits high activity for polymerizing alpha-olefins to crystalline high polymer. The resulting polymers have a crystallinity, in the case of, for example, polypropylene, such that the n-heptane insoluble portions is of the order of 75–90%. The value depends on reaction conditions such as the solvent, the temperature and the pressure.

When this polymer is used for textile fibers or plastics there is some inconvenience with respect to its crystallinity. In order to be servicable, preferably the n-heptane insoluble portion should be above 90%.

According to this invention, poly-alpha-olefins having high stereospecificity and high crystallinity can be obtained in high yield, by using the foregoing two-component catalyst system modified by the addition of a third component as a regulator.

The order in which the first and the second components making up the principal catalyst and said third component are added is optional. For instance, the first and second components may be mixed together first and then the third component be added to the mixture, or the first and third components may be mixed together first followed by addition of the second component, or the first component may be added to a mixture of the second and third components. It is also possible to mix together the three components all at once.

As the third component, one of the compounds (i)–(vi) described below is chosen and used.

(i) Compounds of the formula $$PX_3 \text{ or } POX_3$$

where X is halogen.

Included as these phosphorus trihalides and phosphorus oxytrihalides are phosphorus trichloride, phosphorus tribromide, phosphorus oxytrichloride and phosphorus triiodide. The addition of the third component such as these is highly effective even though the addition is in a minute quantity. For example, the n-heptane insoluble portion of polypropylene reaches as high as 98% or more by addition of small amount of $PCl_3$.

(ii) Compounds of the formula $$SOX_2 \text{ or } SO_2X_2$$

where X is halogen

As thionyl halides or sulfuryl halides, thionyl chloride, thionyl bromide, sulfuryl chloride and sulfuryl iodide are conveniently used.

(iii) Compounds of the formula

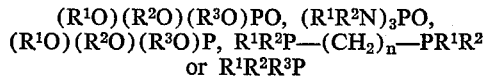

where $R^1$, $R^2$ and $R^3$ are the same or different hydrocarbon radicals of up to 8 carbon atoms and $n$ is an integer 1–8.

As these compounds, preferred are those whose hydrocarbon radicals are alkyl and/or aryl. Examples include trimethylphosphite, triethylphosphite, tri-n-butylphosphite, triphenylphosphite, cresyl-diphenylphosphate, triethylphosphate, tri-n-butylphosphate, trimethylphosphate, tri-n-butylphosphine, triphenylphosphine, hexamethylphosphoric triamide, 1,2-bis(diphenylphosphino)ethane and 1,4-bis(diphenylphosphino)butane.

These compounds are neither ignitable nor do they evolve a combustible gas by reacting with water and oxygen. Thus, their handling is not only simple but also safe. Further, inasmuch as they can enhance the crystallinity of the resulting polymer by addition in a small quantity, they are of great advantage.

(iv) Compounds of the formula $$(R^4R^5N)_nSiX_{4-n}$$

where $R^4$ is a hydrocarbon radical up to 8 carbon atoms, $R^5$ is hydrogen or a hydrocarbon radical up to 8 carbon atoms, X is halogen, hydrogen or a hydrocarbon radical up to 8 carbon atoms and $n$ is a natural number not exceeding 4.

In such compounds, when the aforesaid $R^4$, $R^5$ and X are hydrocarbon radicals, they are preferably either alkyl or aryl. As examples there can be mentioned tetrakis-(dimethylamino)silane, chlorotris(dimethylaminomono)silane, dichlorobis(dimethylamino)silane, dimethylaminotrichlorosilane, tris(diethylamino)methylsilane, dimethylbis(dimethylamino)silane and tris(dimethylamino)phenylsilane.

By the addition of the third component such as mentioned above, polymers having a crystallinity whose n-heptane insoluble portion is above 90% can be obtained.

(v) Compounds of the formula

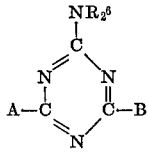

where $R^6$ is an alkyl radical of up to 8 carbon atoms, A and B are alkyl, aryl and aralkyl radicals of up to 8 carbon atoms, dialkylamino radical having an alkyl radical up to 8 carbon atoms, or halogen; A and B are the same or different radicals.

As such compounds included are, e.g., hexaethylmelamine, hexamethylmelamine-6-chloro, 2,4-bis(diethylamino)-s-triazine and 2-diethylamino-4,6-dichloro-s-triazine. The third component such as these are stable to oxygen and water, and by their addition in a small quantity to the principal catalyst, polymers of good crystallinity whose n-heptane insoluble portion is above 95% can readily be obtained.

(vi) Compounds of the formula

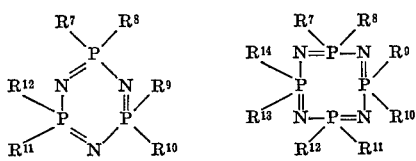

where $R^{7-14}$ are halogens or $NQ_2$, in which Q is either H or alkyl.

Such compounds include, e.g., the phosphonitrile derivatives such as hexachloro-1,3,5-cyclotriphosphazatriene,
2,4,6-trichloro-2,4,6-tris(dimethylamino)-1,3,5-cyclotriphosphazatriene,
hexakis(dimethylamino)-1,3,5-cyclotriphosphazatriene and hexakis(diethylamino)-1,3,5-cyclotriphosphazatriene.

Polymers whose boiling n-heptane insoluble portion is above 95% can readily be prepared in good yield, using the catalyst systems comprising before-mentioned principle catalyst and the compounds described in (i)–(vi). Compounds of (i), (ii) and (iv) are especially preferred as a regulator in view of the superior results that are obtainable as compared with the others.

The proportion in which the catalyst components of the invention are mixed, can be chosen in the following manner. The organoaluminum compound of the formula $R_4Al_2SO_4$, the second component, can usually be used at the ratio of the order of 0.05–10 mols, and preferably 0.1–5 mols to one mol of the halides or oxyhalides of transition metals of Groups IV-A—VI-A of the periodic table, the first component. On the other hand, when the third component is used together, this component is usually used at the ratio of the order of 0.005–20 mols, and preferably 0.02–3 mols, to one mol of said organoaluminum compound, the second component, though this may vary depending upon the class of the compounds (i)–(vi). The addition of the third component in a large amount does not affect the yield of poly-alpha-olefins of high stereospecificity, but results in decrease in the polymerizateion activity. Therefore, there is no particular advantage in adding the excess amount of the third component.

Further, according to the invented process, the polymerization reaction can be carried out without using a solvent but by contacting the mixture of the catalyst components with the monomer in the vapor phase. The polymerization reaction can also be carried out in a liquid monomer without using a solvent. However, the reaction is usually carried out in an inert reaction medium. Particularly suitable as the inert medium are the hydrocarbons and chlorinated hydrocarbons. Typical examples include the saturated aliphatic hydrocarbons such as propane, pentane, hexane, heptane, octane and decane: the alicyclic hydrocarbons such as cyclohexane, cyclopentane, methyl cyclohexane and decahydronaphthalene: the aromatic hydrocarbons such as benzene, toluene, xylene, and ethylbenzene: the aromatic chlorinated hydrocarbons such as chlorobenzene, o-dichlorobenzene and alphachloronaphthalene. These media can be used either singly or as a mixture of two or more components. The hydrocarbon mixtures such as kerosene, petroleum benzine, ligroin and petroleum ether are also conveniently used. In all cases, it is preferred that these reaction media (solvents) be dehydrated and purified before use. The purification can be carried out by combining washing with sulfuric acid, adsorption, and contact with metals of Groups I-A—III-A of the periodic table or the organometallic compounds or complexes thereof.

In using these media in the polymerization reaction, the use thereof is made in an amount, based on the transition metal halide or oxyhalide, of the order of 5000 folds by weight thereof, and preferably about 100–2500 folds by weight.

The polymerization reaction can be carried out continuously, semicontinuously or batchwise. For achieving uniformity of the properties of the polymer when carrying out the polymerization reaction continuously, the catalyst components must be introduced into the reactor at constant ratio. Further, the polymerization catalyst mixture can be treated at 60–150° C. before using.

In addition, the method of contacting the catalyst with alpha-olefin can be carried out by means of the slurry method or by means of a fixed, fluidized or moving bed.

The temperature of the polymerization reaction is 0–150° C. preferably 30–100° C. As to the reaction pressure, there is no particular restriction, but this depends upon the monomer to be polymerized. Normal atmospheric or superatmospheric pressure can be employed, and the preferred range is 1–30 kg./cm.$^2$.

In case of the polymerization of propylene, it is possible to carry out the polymerization reaction at reduced pressure because of the high activity of the new catalyst system. But it is also advantageous to carry out the reaction under pressure of a few kg./cm.$^2$ for obtaining a reasonable polymerization rate. The polymerization reaction can be carried out at a pressure up to 100 kg./cm.$^2$, or still higher, but generally high pressures are not required.

The alpha-olefins to which the invented process is applicable are those containing 2–12 carbon atoms, and include the straight-chain alpha-olefins such as ethylene, propylene, butene-1, pentene-1, hexene-1, heptene-1, octene-1 and decene-1: the branched alpha-olefins such as 3-methylbutene-1, 4-methylpentene-1 and 4-methylhexene-1: alpha-olefins with aromatic groups such as allylbenzene, styrene, alpha-methylstyrene, or other substituted styrenes: the alpha-olefins having a cyclic hydrocarbon radical, such as vinyl cyclohexane.

These alpha-olefins can be used alone, or two or more of them can be mixed and copolymerized, or they may be block copolymerized. Further, it is also possible to copolymerize one or more of the alpha-olefiins with olefins other than alpha-olefins, such as butadiene, isoprene, 1,4-hexadiene and dicyclopentadiene.

The molecular weight of those polymers whose crystallinity are high usually becomes considerably great, but by adding hydrogen to the system during the polymerization reaction, the average molecular weight of the resulting polymer can be easily controlled. Besides this, the halides or alkyl compounds of zinc, cadmium or mercury, halogenated hydrogen or halogenated alkyls can be used as molecular weight controllers.

As to the purification of the polymers, the procedures employed in the conventional olefin polymerization process which uses an organometallic catalyst can be used.

The present invention will be explained more clearly in the following examples. However, it should be noted that the present invention is not limited to these examples.

EXAMPLE 1

An electromagnetic stirrer type autoclave with a capacity of 200 cc. was charged in an atmosphere of nitrogen with 60 cc. of pure n-heptane, 2 mmols of titanium trichloride (as TiCl$_3$) which had been produced by reducing titanium tetrachloride with aluminum metal, and 4 mmol of bis(diethylaluminum)sulfate. After the system was closed, the vessel was purged with propylene. After stirring was started, the temperature of the reactants were gradually raised to 50° C. in 10 minutes, and then propylene was added continuously. Polymerization was carried out a 5 kg./cm.$^2$ gauge and 50° C. Upon completion of polymerization, methanol was added to decompose the catalyst used. Purification was performed by the ordinary method. The product was dried in a vacuum drier for 24 hours. 63 g. of polypropylene was obtained. The intrinsic viscosity measured in tetralin at 135° C. was 6.248 dl./g.

COMPARABLE EXAMPLE 1

For comparison, propylene was polymerized under the same conditions as in Example 1, except that diethyl aluminum chloride was used in place of bis(diethylaluminum)sulphate. The amount of polypropylene was only 45 g.

EXAMPLE 2

Propylene was polymerized for 1 hour under the same conditions as in Example 1, except that 50 cc. (N.T.P.) of hydrogen was added as a molecular weight controlling agent after the system was purged with propylene. Purification was performed with methanol by the ordinary method. The output of polypropylene was 48.5 g., and the intrinsic viscosity of this product was 2.568 dl./g.

EXAMPLE 3

A 200 cc. autoclave was charged in an atmosphere of nitrogen with 50 cc. of toluene, 50 cc. of styrene, 2 mmol of titanium trichloride (AA grade manufactured by Stauffer Chem. Co.) and 2 mmols of bis-diethyl aluminum sulphate. And polymerization was carried out for 3 hours at 50° C. After the polymerization, the purification was carried out with methanol by the oridinary method. The polymer produced was dried and weighed, its output being 1.3 g.

EXAMPLE 4

The same autoclave as in Example 1 was charged with 60 cc. of n-heptane, 2 mmols of vanadium oxytrichloride and 4 mmol of bis(diethylaluminum) sulfate. Ethylene was polymerized at a pressure of 3 kg./cm.$^2$ gauge and a temperature of 70° C. After polymerization had been continued for 15 minutes, stirring was stopped. When the autoclave was opened, it was found that the polymer had been produced in the form of flakes. Purification was carried out by the ordinary method. The product was dried and weighed. The output was 17.2 g. The intrinsic viscosity of this product measured in tetralin at 135° C. was 19.16 dl./g.

EXAMPLE 5

The same autoclave as in Example 1 was charged with 60 cc. of n-heptane, 2 mmol of vanadium tetrachloride, and 4 mmols of bis(diethylaluminum)sulfate. Ethylene was polymerized at a pressure of 3 kg./cm.$^2$ gauge and a temperature of 50° C. As soon as polymerization started, stirring was stopped. The autoclave was allowed to stand for 2 hours. During this period, the temperature in the autoclave rose up to 80° C. The polymer was discharged, purified by the ordinary method and dried. The output was 31.5 g. The intrinsic viscosity of the polymer measured in tetralin at 135° C. was 15.66 dl./g.

EXAMPLE 6

Butene was polymerized for 2 hours in the same manner as in Example 1 at temperature of 50° C. and pressure of 1.5 kg.cm.$^2$ gauge. The polymer output was 7.5 g. The intrinsic viscosity of the product measured in tetralin at 135° C. was 4.245 dl./g.

EXAMPLE 7 TO 11

Ethylene and propylene were copolymerized, using titanium or vanadium compounds as transition metal compounds, and bis(diethylaluminum)sulfate as organic aluminum componds. A bottle with a capacity of 633 cc. which had been throroughly washed and dried, was purged with nitrogen. Then it was charged with 250 cc. of pure n-heptane and 5 mmols of titanium or vanadium compounds. The bottle was purged with propylene, and 10 mmols of bis(diethylaluminum)sulfate (2 mmols/l. benzene solution) was introduced. Immediately, 2 l. of propylene and ethylene gas mixtures (molar ratio C$_2$/C$_3$, 3/2) was added. Polymerization was conducted at 50° C. for 5 hours. However, when VOCl$_3$ or VCl$_4$ was used, heat was released as soon as the gas mixture was charged, and a vigorous reaction occurred. Consequently the mass was allowed to stand at room temperature for 1 hour. Upon completion of the polymerization, the product was purified by the ordinary method and dried. The results of polymerization are presented in Table 1 given below.

When VOCl$_3$ or VCl$_4$ was used, a vigorous reaction took place and polymer was produced in so large amounts, that it was impossible to measure the final pressure. When VOCl$_3$ or VCl$_4$ were used as catalyst components, transparent rubbery product was obtained, but when TiCl$_3$ or VCl$_3$ were used, opaque rubber elastmer was obtained.

The propylene content determined from the infrared absorption spectrum of the polymer was high in all cases. The crystallization bands of polyethylene were not observed.

EXAMPLE 14

Propylene was polymerized using titanium trichloride, bis(diethylaluminum)sulfate and phosphorous oxytrichlo-

TABLE 1

| Example No. | Transition Metal Compounds Formula | Mmols | $(C_2H_5)_4Al_2SO_4$ (mmols) | Final pressure [1] (50° C.) | Polymer output (gr.) | Propylene content (percent) of copolymer [2] |
|---|---|---|---|---|---|---|
| 7 | $TiCl_3$ (AA) | [3] 5 | 10 | −600 mm. Hg | 18.33 | 67.5 |
| 8 | $TiCl_4$ | 5 | 10 | −300 mm. Hg | 14.78 | 62.7 |
| 9 | $VOCl_3$ | 5 | 10 | Measurement was impossible. | 16.41 | 74.0 |
| 10 | $VCl_3$ | [4] 5 | 10 | 0.7 atm | 11.83 | 49.3 |
| 11 | $VCl_4$ | 5 | 10 | Measurement was impossible. | 17.36 | 70.6 |

[1] Gauge pressure inside the bottle after polymerization.
[2] Determined from the infrared absorption spectrum in accordance with the following literature: H. V. Drushel, F. A. Iddings, Anal. Chem. 35, 28 (1963).
[3] 1.000 gram.
[4] 0.783 gram.

EXAMPLE 12

Propylene was polymerized in the same manner as in Example 1, using dimethyl aluminum-diethyl aluminum sulfate and di-n-propyl aluminum-diisopropyl aluminum sulfate respectively in place of bisdiethylaluminum sulfate. In either case a solid polymer was obtained.

EXAMPLE 13

Propylene was polymerized in a bottle with a capacity of 633 cc., using titanium trichloride, bis(diethylaluminum) sulfate and phosphorus trichloride. Polymerization was conducted in the following manner. The bottle was dried and purged with nitrogen and thereafter was charged with 250 cc. of heptane and 2 mmols of titanium trichloride. After the bottle was capped, its interior was purged with propylene and then charged with propylene-bis(diethylaluminum)sulfate and phosphorus trichloride. Polymerization was carried out at 50° C. for 17 hours. Upon completion of the polymerization, 200 cc. of methanol was introduced to decompose the catalysts. The polymer obtained was washed and dried in a vacuum drier at 50° C. for 24 hours. The results are presented in Table 2 below.

ride and in the same manner as in Example 13. The results are shown in Table 3 below.

TABLE 3

| Test No. | $TiCl_3$ (AA) (mmol) | $(C_2H_5)_4Al_2SO_4$ (mmol) | $POCl_3$ (mmol) | Final propylene pressure (at 50° C.) | Polymer yield (g.) | n-Heptane insoluble portion (percent) |
|---|---|---|---|---|---|---|
| 1 | 0.4161 | 1 | 0.1 | −550 mm. Hg | 34.48 | 92.48 |
| 2 | 0.4161 | 1 | 0.2 | −550 mm. Hg | 35.76 | 94.50 |
| 3 | 0.4163 | 1 | 0.3 | −550 mm. Hg | 34.39 | 95.88 |
| 4 | 0.4167 | 1 | 0.4 | −550 mm. Hg | 37.14 | 96.67 |
| 5 | 0.4168 | 1 | 0.5 | −550 mm. Hg | 35.10 | 97.75 |
| 6 | 0.4168 | 1 | 1.0 | 1.0 atm | 25.43 | |
| 7 | 0.4170 | 1 | 2.0 | 4.4 atm | 0.94 | |

EXAMPLE 15

Polymerization was carried out for 3 hours in practically the same manner as in Example 13, except that hydrogen was added in order to control the molecular weight. The results are presented in Table 4 below.

TABLE 4

| Test No. | $TiCl_3$ (AA) (g.) | $(C_2H_5)_4Al_2SO_4$ (mmol) | $PCl_3$ (mmol) | Hydrogen (30° C.),cc. | Final pressure (50° C.) | Polymer yield (g.) | n-Heptane insoluble portion (percent) | Viscosity ($\eta_{sp}$°C.) (dl./g.) |
|---|---|---|---|---|---|---|---|---|
| 1 | 0.4113 | 1 | 0.1 | 120 | −200 mm. Hg | 34.31 | 93.57 | 2.31 |
| 2 | 0.4113 | 1 | 0.2 | 120 | 0.85 atm | 28.46 | 96.20 | 2.17 |

NOTE.—The above values for the viscosity $\eta_{sp}$° C. were measured at a polymer concentration of 0.04 g./100 cc. in Tetralin at 135 °C.

EXAMPLE 16

A 100 l. autoclave was charged in an atmosphere of nitrogen with 50 l. of pure heptane, 50 g. of titanium trichloride (AA), 33 g. of bis(diethylaluminum)sulfate and 1.7 g. of phosphorus trichloride. After the system was closed, 25 l. (N.T.P.) of hydrogen was added and the temperature was raised up to 50° C. The polymerization was started with the pressure of propylene adjusted to 5 kg./cm.$^2$ (G). Twenty-five kg. of propylene was supplied in 16.5 hours. Purification was conducted with methanol containing hydrogen chloride in accordance with the ordinary method. The polymer obtained was dried at 70° C.

TABLE 2

| Test No. | $TiCl_3$ (AA) (g.) | $(C_2H_5)_4Al_2SO_4$ (mmol) | $PCl_3$ (mmol) | Final propylene pressure (at 50° C.) | Polymer yield (g.) | n-Heptane insoluble portion (percent) |
|---|---|---|---|---|---|---|
| 1 | 0.3955 | 1 | 0.5 | 0.2 atm | 30.68 | 98.08 |
| 2 | 0.3960 | 1 | 1.0 | 0.2 atm | 31.52 | 98.14 |
| 3 | 0.3961 | 1 | 2.0 | 1.6 atm | 21.17 | 98.15 |
| 4 | 0.3930 | 1 | 0.1 | −550 mm. Hg | 34.39 | 96.63 |
| 5 | 0.3940 | 1 | 0.2 | −550 mm. Hg | 32.88 | 97.76 |
| 6 | 0.3950 | 1 | 0.3 | −560 mm. Hg | 32.85 | 97.73 |
| 7 | 0.3958 | 1 | 0.4 | −500 mm. Hg | 32.59 | 97.83 |

NOTE.—$TiCl_3$ (AA) is the active titanium trichloride obtained by reducing titanium tetrachloride by aluminum metal.

for 24 hours. The yield of polypropylene was 20 kg. The specific viscosity of the polymer, as measured in Tetralin at 135° C., was 2.35 dl./g., and the n-heptane insoluble portion was 96.8%. The foregoing value for the viscosity was determined at a polymer concentration of 0.04 g./100 cc. in Tetralin at 135° C.

EXAMPLE 17

Propylene was polymerized in a 633 cc. bottle, using titanium trichloride, bis(diethylaluminum)sulfate and thionyl chloride. All the operation was conducted in an atmosphere of nitrogen. The bottle was also charged with 250 cc. of heptane as solvent and propylene was charged up to 3 atmospheres. Polymerization was conducted at 50° C. for 17 hours. Upon completion of the polymerization, 200 cc. of methanol was charged to decompose the catalyst. The product was further washed with methanol. The results are presented in Table 5 given below.

COMPARATIVE EXAMPLE 2

This experiment was conducted in the same manner as in Example 17, except that thionyl chloride was not added for comparison. The n-heptane insoluble portion of the polymer obtained ranged from 79 to 82 percent.

EXAMPLE 19

A 633 cc. bottle which had been dried and purged with nitrogen was charged with 250 cc. of heptane and about 0.4 g. (2 mmole) of titanium trichloride. After capped, the bottle was purged with propylene, and charged with 1.2 cc. of heptane solution of 0.08 mol/e. of bis(diethylaluminum)sulfate and the predetermined amount of organic phosphorous compounds. Finally propylene was introduced until the pressure within the bottle reached 3 atmospheres. Polymerization was conducted at 50° for 3 hours. The pressure in the bottle was measured at 50° C. About 200 cc. of methanol was added to decompose the catalyst. White powdery polymer was filtered and was washed with methanol. The product was dried in vacuo at 50° C. for 24 hours. The polymer yield and its n-heptane insoluble portion were measured. The results are presented in Table 7 below.

TABLE 7

| Test No. | TiCl₃ (AA) (g.) | (C₂H₅)₄Al₂SO₄ (mmol) | Hexamethyl phosphoric triamide (mmol) | Final propylene pressure (50° C.) | Polymer yield (g.) | n-Heptane insoluble portion (percent) |
|---|---|---|---|---|---|---|
| 1 | 0.3923 | 1 | 0 | −400 mm. Hg | 36.31 | 82.00 |
| 2 | 0.3924 | 1 | 0.02 | −400 mm. Hg | 36.28 | 82.95 |
| 3 | 0.3926 | 1 | 0.04 | −310 mm. Hg | 34.80 | 87.21 |
| 4 | 0.3927 | 1 | 0.06 | −290 mm. Hg | 35.45 | 88.65 |
| 5 | 0.3930 | 1 | 0.08 | −220 mm. Hg | 35.23 | 90.74 |
| 6 | 0.3932 | 1 | 0.12 | −150 mm. Hg | 35.01 | 92.27 |
| 7 | 0.3934 | 1 | 0.20 | −100 mm. Hg | 33.23 | 92.70 |
| 8 | 0.3945 | 1 | 0.28 | −30 mm. Hg | 33.52 | 92.37 |
| 9 | 0.3947 | 1 | 0.36 | −10 mm. Hg | 33.18 | 92.03 |
| 10 | 0.3958 | 1 | 0.45 | −10 mm. Hg | 33.15 | 91.82 |

As shown in the above table, addition of the third component noticeably improved the crystallinity of the product.

Notes:

(1) TiCl₃ (AA) is titanium trichloride which can be obtained by activating titanium trichloride that has been made by reducing titanium tetrachloride with aluminum metal.

TABLE 5

| Test No. | TiCl₃ (AA) (g.) | (C₂H₅)₄Al₂SO₄ (mmol) | SOCl₂ (mmol) | Final propylene pressure (50° C.) | Polymer yield (g.) | n-Heptane insoluble portion (percent) |
|---|---|---|---|---|---|---|
| 1 | 0.3825 | 1 | 0.1 | −550 mm. Hg | 35.89 | 94.82 |
| 2 | 0.3830 | 1 | 0.2 | −350 mm. Hg | 33.59 | 96.44 |
| 3 | 0.3832 | 1 | 0.3 | 0.1 atm | 29.98 | 97.20 |
| 4 | 0.3847 | 1 | 0.4 | 1.1 atm | 25.45 | 97.33 |
| 5 | 0.3847 | 1 | 0.5 | 2.0 atm | 21.62 | 97.58 |
| 6 | 0.3859 | 1 | 1.0 | 4.2 atm | 0.147 |  |

NOTE.—TiCl₃ (AA) is the titanium chloride obtained by reducing titanium tetrachloride with aluminum metal.

EXAMPLE 18

Propylene was polmerized under practically the same conditions as in Example 17, using titanium trichloride, bis(diethylaluminum)sulfate and sulfuryl chloride. The results are shown in Table 6 below.

(2) The final propylene pressure is the gauge pressure within the bottle measured at 50° C. upon completion of the polymerization.

EXAMPLE 20

Propylene was polymerized in practically the same manner as in Example 19, except that different kinds of

TABLE 6

| Test No. | TiCl₃ (AA) (g.) | (C₂H₅)₄Al₂SO₄ (mmol) | SO₂Cl₂ (mmol) | Final propylene pressure (50° C.) | Polymer yield (g.) | n-Heptane insoluble portion (percent) |
|---|---|---|---|---|---|---|
| 1 | 0.4005 | 1 | 0.1 | −550 mm. Hg | 35.27 | 89.69 |
| 2 | 0.4009 | 1 | 0.2 | −550 mm. Hg | 37.03 | 93.81 |
| 3 | 0.4057 | 1 | 0.3 | −400 mm. Hg | 26.06 | 96.14 |
| 4 | 0.4071 | 1 | 0.4 | 0.4 atm | 31.14 | 96.41 |
| 5 | 0.4080 | 1 | 0.5 | 0.85 atm | 28.34 | 96.95 |
| 6 | 0.4081 | 1 | 1.0 | 4.4 atm | 4.69 | 95.75 | the third components were used and that the polymerization was continued for 17 hours. The results are shown in Table 8 below.

tion) of bis(diethylaluminum) sulfate solution and 1.0 mmol of tetrakis(dimethylamino)silane (as 1.0 cc. of heptane solution). Finally 50 cc. of 4-methylpentene-1

TABLE 8

| Test No. | TiCl$_3$(AA) (g.) | (C$_2$H$_5$)$_4$Al$_2$SO$_4$ (mmol) | Third Component | | | Final propylene pressure | Polymer yield (g.) | n-Heptane insoluble portion (percent) |
|---|---|---|---|---|---|---|---|---|
| | | | mmol | Name | Formula | | | |
| 1 | 0.3982 | 1.55 | 1.0 | Triphenyl phosphite | (C$_6$H$_5$O)$_3$P | 2.8 atm | 16.64 | 95.21 |
| 2 | 0.3969 | 1.55 | 0.2 | Trimethyl phosphate | (CH$_3$O)$_3$PO | 3.0 atm | 10.07 | 93.86 |
| 3 | 0.3993 | 1.55 | 0.5 | Triphenyl phosphine | (C$_6$H$_5$)$_3$P | −500 mm. Hg | 31.68 | 88.22 |
| 4 | 0.3970 | 1.55 | 0.2 | Triethyl phosphite | (C$_2$H$_5$O)$_3$P | 3.8 atm | 2.60 | 97.13 |
| 5 | 0.3970 | 1.55 | 0.2 | Triethyl phosphate | (C$_2$H$_5$O)$_3$PO | −100 mm. Hg | 32.41 | 90.59 |
| 6 | 0.4007 | 1.55 | 1.0 | Tri-n-butyl phophine | (n-C$_4$H$_9$)$_3$P | 0.95 atm | 12.30 | 94.75 |
| 7 | 0.3877 | 1.55 | 1.0 | Hexamethyl phosphoric triamide | [(CH$_3$)$_2$N]$_3$-PO | −150 mm. Hg | 32.79 | 92.53 |

As shown in the above table, addition of the third components improved the crystallinity of the polymer.

EXAMPLE 21

A 633 cc. bottle which had been dried and purged with nitrogen was charged with 250 cc. of heptane and 0.4 g. (2 mmols) of titanium trichloride. After capped, the bottle was purged with propylene, and then charged with 3.8 mmol (3.0 cc. of heptane solution) of bis(diethylaluminum)sulfate and heptane solution of tetrakis(dimethylamino)silane. Propylene was introduced until the pressure within the bottle reached 3 atmospheres. Polymerization was carried out at 50° C. for 3 hours. Upon completion of the polymerization, the pressure was measured at 50° C. About 200 cc. of methanol was added to decompose the catalyst. White powdery polymer was filtered off and boiled with methanol for 24 hours, and then dried in vacuo at 50° C. for 24 hours. Determination was made of the polymer yield, n-heptane insoluble portion, viscosity $\eta_{sp}/C$ and bulk density of the polymer obtained. The value for the viscosity was measured at the polymer concentration of 0.04/g./100 cc. in Tetralin at 135° C. The results are presented in Table 9 below.

was added. Polymerization was carried out at 50° C. for 24 hours. Upon completion of the polymerization, 200 cc. of methanol was added to decompose the catalyst. The polymer obtained was subjected to the same treatment as in Example 21. The polymer yield was 18.44 g. and the conversion was 55.5 percent. The product indicated 94.6 percent of n-heptane insoluble portion and viscosity $\eta_{sp}/C$ of 9.89 dl./g. This viscosity was measured at a polymer concentration of 0.04 g./100 cc. in Tetralin at 135° C. Another polymerization was carried out under the same conditions as described above, except that tetrakis(dimethylamino)silane was not added to the catalyst system. In this case 32.47 g. of polymer was obtained, and the conversion was 97.7 percent. However, this polymer indicated 86.9 percent of n-heptane insoluble portion and viscosity $\eta_{sp}/°C.$ of 8.57 dl./g.

EXAMPLE 23

Propylene was polymerized in a 633 cc. bottle under the same conditions as in Example 21, except that different kinds of the third components were used. 250 cc.

TABLE 9

| Test No. | TiCl$_3$ (AA) (g.) | (C$_2$H$_5$)$_4$Al$_2$SO$_4$ (mmol) | Tetrakis (dimethylamino)silane (mmol) | Final propylene pressure (at 50° C.) | Polymer yield (g.) | n-Heptane insoluble portion (percent) | Viscosity ($\eta_{sp}/°C.$) | Bulk density (g./c.c.) |
|---|---|---|---|---|---|---|---|---|
| 1 | 0.3807 | 3.8 | 0 | −620 mm. Hg | 34.69 | 76.82 | 9.88 | 0.154 |
| 2 | 0.3814 | 3.8 | 0.2 | −100 mm. Hg | 32.62 | 93.34 | 16.03 | 0.204 |
| 3 | 0.3820 | 3.8 | 0.4 | 0.32 atm | 28.49 | 95.04 | 15.51 | 0.209 |
| 4 | 0.3833 | 3.8 | 0.8 | 2.00 atm | 17.28 | 93.41 | 18.74 | 0.156 |
| 5 | 0.3834 | 3.8 | 1.2 | 0.10 atm | 29.57 | 95.45 | 15.23 | 0.192 |
| 6 | 0.3845 | 3.8 | 1.6 | 0.30 atm | 29.36 | 95.58 | 15.56 | 0.182 |

NOTE.—1 TiCl$_3$ (AA) is the titanium trichloride obtained by reducing titanium tetrachloride with aluminum metal.
NOTE.—2 The final propylene pressure is the gauge pressure within the bottle measured at 50° C. upon completion of polymerization.

As shown in the above table, polypropylene obtained by use of a binary catalytic system had only 76.82 percent of n-heptane insoluble portion, whereas addition of a small amount of tetrakis(dimethylamino)silane enhanced the value to more than 95 percent.

of heptane was first charged and propylene was charged up to 3 atmospheres (at room temperature). The polymerization was conducted at 50° C. for 17 hours. The results are presented in Table 10 below.

TABLE 10

| Test No. | TiCl$_3$ (AA) (g.) | (C$_2$H$_5$)$_4$Al$_2$SO$_4$ (mmols) | Third Component | | | Final propylene pressure (50° C.) | Polymer yield (g.) | n-Heptane insoluble portion (percent) |
|---|---|---|---|---|---|---|---|---|
| | | | (mmol) | Name | Formula | | | |
| 1 | 0.4146 | 1.43 | 0.4 | Chlorotris (dimethylamino) silane | [(CH$_3$)$_2$N]$_3$SiCl | −600 mm. Hg | 36.67 | 92.36 |
| 2 | 0.4152 | 1.43 | 0.6 | Dichlorobis (dimethylamino) | [(CH$_3$)$_2$N]$_2$SiCl$_2$ | −600 mm. Hg | 34.04 | 92.64 |
| 3 | 0.4160 | 1.43 | 0.8 | Dimethylaminotrichlorosilane | (CH$_3$)$_2$NSiCl$_3$ | −600 mm. Hg | 35.01 | 92.80 |
| 4 | 0.4172 | 1.43 | 0.6 | Bis(diethylamino)dimethyl silane | [(C$_2$H$_5$)$_2$N]$_2$Si(CH$_3$)$_2$ | −400 mm. Hg | 34.50 | 92.49 |
| 5 | 0.4173 | 1.43 | 0.8 | Diethylaminotrimethylsilane | (C$_2$H$_5$)$_2$NSi(CH$_3$)$_3$ | −600 mm. Hg | 37.12 | 74.33 |
| 6 | 0.4173 | 1.43 | 1.0 | Phenylaminotrimethylsilane | (C$_6$H$_5$)HNSi(CH$_3$)$_3$ | 3.4 atm | 8.53 | 91.30 |

NOTE.—1 Bis(diethylaluminum)sulfate was added as tetralin solution.

EXAMPLE 22

4-methylpentene-1 was polymerized in practically the same manner as in Example 21. A 633 cc. bottle was charged with 250 cc. of heptane and 0.9716 g. (about 5 mmols) of titanium trichloride. After capped, the bottle was charged with 3.07 mmols (as 7.5 cc. of Tetralin solu- As shown in the above table, addition of the third components listed above noticeably increased the crystallinity of the polymer produced.

EXAMPLE 24

A 633 cc. bottle which had been dried and purged with nitrogen was charged with 250 cc. of heptane and 0.4 g.

(2 mmols) of titanium trichloride. After capped, the bottle was purged with propylene and then charged with 30 cc. heptane solution of 3.8 mmols of bis(diethylaluminum) sulfate and 1 mol/l. heptane solution of hexaethyl melamine. Thereafter propylene was added until the pressure in the bottle reached 3 atmospheres. Polymerization was carried out at 50° C. for 3 hours. Upon completion charged with 250 cc. of heptane and 1 g. (5 mmols) of titanium trichloride. After capped, the bottle was charged with 3.07 mmols of bis(diethylaluminum) sulfate and 1.0 mmol of hexaethylmelamine or hexamethylmelamine and finally 50 cc. of 4-methylpentene-1. Polymerization was carried out at 50° C. for 24 hours. The results are shown in Table 12 below.

TABLE 12

| Test No. | $TiCl_3$(AA) (g.) | $(C_2H_5)_4Al_2SO_4$ (mmol) | Third Component | | | Polymer | | n-Heptane insoluble portion (percent) | Viscosity ($\eta_{sp}/°$ C.) (dl./g.) |
|---|---|---|---|---|---|---|---|---|---|
| | | | Mmol | Name | Formula | Output (g.) | Yield (percent) | | |
| 1 | 0.9830 | 3.07 | 0 | | | 32.47 | 97.71 | 86.96 | 8.57 |
| 2 | 0.9756 | 3.07 | 1.0 | Hexaethylmelamine | $N(C_2H_5)_2$ triazine with three $N(C_2H_5)_2$ groups | 24.47 | 73.66 | 95.60 | 11.71 |
| 3 | 0.9782 | 3.07 | 1.0 | Hexamethylmelamine | $N(CH_3)_2$ triazine with three $N(CH_3)_2$ groups | 2.69 | 8.05 | 95.30 | 10.70 | of the polymerization, the pressure within the bottle was measured at 50° C. and about 200 cc. of methanol was introduced to decompose the catalyst. White powdery polymer obtained was filtered off, boiled with methanol for 24 hours, and dried in vacuo at 50° C. for 24 hours. Determination was made of the polymer yield, percentage of n-heptane insoluble portion, a reduced viscosity $\eta_{sp}/°$C. and bulk density. The viscosity was measured at a polymer concentration of 0.04 g./100 cc. in Tetralin at 135° C. The results are shown in Table 11 below.

As shown in the above-mentioned table, when the third components were not added, the poly-4-methylpentene-1 obtained indicated only 86.96 percent of n-heptane insoluble portion, whereas addition of hexamethylmelamine or hexaethylmelamine produced poly-4-methylpentene-1 of a high crystallinity.

EXAMPLE 26

Propylene was polymerized using a ternary catalytic system consisting of titanium trichloride (AA), bis(di-

TABLE 11

| Test No. | $TiCl_3$ (AA) (g.) | $(C_2H_5)_4Al_2SO_4$ (mmol) | Hexaethyl melamine (mmol) | Final propylene pressure (50° C.) | Polymer yield (g.) | n-Heptane insoluble portion (percent) | Viscosity ($\eta_{sp}/°$C.) (dl./g.) | Bulk density (g./cc.) |
|---|---|---|---|---|---|---|---|---|
| 1 | 0.3807 | 3.8 | 0 | −620 mm. Hg | 34.69 | 76.82 | 9.88 | 0.154 |
| 2 | 0.3856 | 3.8 | 0.2 | −200 mm. Hg | 31.93 | 93.90 | 16.18 | 0.213 |
| 3 | 0.3858 | 3.8 | 0.4 | −30 mm. Hg | 31.35 | 94.57 | 16.36 | 0.207 |
| 4 | 0.3866 | 3.8 | 0.8 | 0.15 atm | 30.35 | 95.68 | 16.63 | 0.210 |
| 5 | 0.3883 | 3.8 | 1.2 | 0.40 atm | 29.86 | 95.86 | 17.06 | 0.194 |
| 6 | 0.3897 | 3.8 | 1.6 | 0.55 atm | 28.83 | 96.31 | 18.90 | 0.211 |

NOTE.—1 $TiCl_3$ (AA) is the titanium trichloride obtained by reducing titanium tetrachloride with aluminum metal.
NOTE.—2 The final propylene pressure is the gauge pressure within the bottle measured at 50° C. upon completion of the polymerization.

As shown in the above table, the polypropylene obtained by use of a binary catalytic system indicated about 76.82 percent of n-heptane insoluble portion, whereas a slight addition of hexaethyl melamine made it easy to produce polypropylene with more than 95 percent of n-heptane insoluble portion.

EXAMPLE 25

4-methylpentene-1 was polymerized by practically the same procedure as in Example 24. A 633 cc. bottle was ethylaluminum) sulfate and hexakis-N-(dimethylamino)-1,3,5-cyclotriphosphazatriene as the third component. A 633 cc. bottle was thoroughly washed and dried. All operations were conducted in an atmosphere of nitrogen. The bottle was charged with 250 cc. of heptane as solvent and propylene was introduced until the pressure within the bottle reached 3 atmospheres. Polymerization was performed at 50° C. for 17 hours. Upon completion of the reaction, 200 cc. of methanol was supplied to decompose the catalyst. The polymer obtained was further washed with methanol. The results are given in Table 13 below.

TABLE 13

| Test No. | $TiCl_3$ (AA) (g.) | $(C_2H_5)_4Al_2SO_4$ (mmol) | Third component (mmol) | Final propylene pressure (50° C.) | Polymer yield (g.) | n-Heptane insoluble portion (percent) |
|---|---|---|---|---|---|---|
| 1 | 0.3868 | 1.1 | 0.05 | −550 mm. Hg | 39.40 | 91.0 |
| 2 | 0.3910 | 1.1 | 0.10 | −400 mm. Hg | 40.60 | 94.1 |
| 3 | 0.3893 | 1.1 | 0.20 | −600 mm. Hg | 37.86 | 96.5 |
| 4 | 0.3813 | 1.1 | 0.40 | −550 mm. Hg | 37.91 | 96.8 |
| 5 | 0.3896 | 1.1 | 0.60 | −200 mm. Hg | 39.69 | 96.9 |
| 6 | 0.4144 | 1.1 | 0.80 | −500 mm. Hg | 38.63 | 97.1 |
| 7 | 0.4190 | 1.1 | 1.0 | −250 mm. Hg | 37.59 | 97.4 |
| 8 | 0.4190 | 1.1 | 1.5 | 1.3 atm | 29.47 | 97.6 |

EXAMPLE 27

Propylene was polymerized using a ternary catalytic system consisting of titanium trichloride (AA), bis(diethylaluminum) sulfate and hexakis(diethylamino)-1,3,5-cyclotriphosphazatriene. Polymerization was conducted for 3 hours under practically the same conditions as in Example 26. The results are presented in Table 14 below.

TABLE 14

| Test No. | TiCl₃ (AA) (g.) | (C₂H₅)₄Al₂SO₄ (mmol) | Third component (mmol) | Final propylene pressure (50° C.) | Polymer yield (g.) | n-Heptane insoluble portion (percent) |
|---|---|---|---|---|---|---|
| 1 | 0.4302 | 1.1 | 0.05 | −400 mm. Hg | 38.17 | 86.9 |
| 2 | 0.4351 | 1.1 | 0.10 | −500 mm. Hg | 36.74 | 90.4 |
| 3 | 0.4331 | 1.1 | 0.20 | −400 mm. Hg | 36.54 | 93.9 |
| 4 | 0.4304 | 1.1 | 0.30 | −350 mm. Hg | 34.78 | 94.5 |
| 5 | 0.4386 | 1.1 | 0.40 | −250 mm. Hg | 37.58 | 95.5 |

EXAMPLE 28

Propylene was polymerized using a ternary catalytic system consisting of titanium trichloride (AA), bis(diethylaluminum)sulfate and 2,4,6 - trichloro - 2,4,6 - trisdiethylamino-1,3,5-cyclotriphosphazatriene. Polymerization was conducted under practically the same conditions as in Example 27. The results are shown in Table 15 below.

TABLE 15

| Test No. | TiCl₃ (AA) (g.) | (C₂H₅)₄Al₂SO₄ (mmol) | Third component (mmol) | Final propylene pressure (50° C.) | Polymer yield (g.) | n-Heptane insoluble portion (percent) |
|---|---|---|---|---|---|---|
| 1 | 0.4314 | 1.1 | 0.10 | −250 mm. Hg | 36.11 | 90.1 |
| 2 | 0.4364 | 1.1 | 0.20 | −450 mm. Hg | 35.13 | 93.6 |

EXAMPLE 29

3-methyl-1-butene was polymerized in a 633 cc. bottle using a ternary catalytic system consisting of titanium trichloride (AA), bis(diethylaluminum)sulfate and hexakis(dimethylamino)-1,3,5 - cyclotriphosphazatriene. The bottle had been thoroughly washed and dried before use, and all operations were conducted in at atmosphere of nitrogen. The bottle was charged with 250 cc. of heptane as solvent and then 50 cc. of 3-methyl-1-butene. Polymerization was carried out at 50° C. for 40 hours. Upon completion of the reaction, 300 cc. of methanol was introduced to decompose the catalyst. The polymer produced was further washed with methanol. The results are presented in Table 16 below.

TABLE 16

| Test No. | TiCl₃(AA) (g.) | (C₂H₅)₄Al₂SO₄ (mmol) | Third component (mmol) | Polymer yield (g.) | n-Heptane insoluble portion (percent) |
|---|---|---|---|---|---|
| 1 | 1.255 | 3.0 | 1.0 | 15.76 | 99.5 |

EXAMPLE 30

4-methyl-1-pentene was polymerized using a ternary catalytic system consisting of titanium trichloride (AA), bis(diethylaluminum)sulfate and hexakis(dimethylamino)-1,3,5-cyclotriphosphazatriene. Polymerization was carried out in practically the same manner as in Example 29. The results are shown in Table 17 below.

TABLE 17

| Test No. | TiCl₃(AA) (g.) | (C₂H₅)₄Al₂SO₄ (mmol) | Third component (mmol) | Polymer yield (g.) | n-Heptane insoluble portion (percent) |
|---|---|---|---|---|---|
| 1 | 1.102 | 3.0 | 1.0 | 12.05 | 84.2 |

We claim:

1. A process for polymerizing alpha-olefins which comprises polymerizing alpha-olefins in the presence of a catalytic amount of a principal catalyst comprising a catalyst composition obtained by mixing together (1) a compound selected from the group consisting of the halides and oxyhalides of transition metals of Groups IV-A—VI-A of the Periodic Table, and
(2) an organoaluminum compound of the formula $$R^4Al_2SO_4$$

where R is the same or different hydrocarbon radical of 1 to 15 carbon atoms; the mole ratio of component (1) to component (2) being 1:0.05–10.

2. The process according to claim 1 wherein the polymerization reaction is effected in the presence of a catalyst composition further including (3) a promoter selected from:
  (i) compounds selected from the group consisting of the compounds of the formulas $PX_3$ and $POX_3$, where X is halogen;
  (ii) compounds selected from the group consisting of the compounds of the formulas $SOX_2$ and $SO_2X_2$, where X is halogen;
  (iii) compounds selected from the group consisting of the compounds of the formulas $$(R^1O)(R^2O)(R^3O)PO$$

$$(R^1R^2N)_3PO$$

$$(R^1O)(R^2O)(R^3O)P$$

$$R^1R^2P-(CH_2)_n-PR^1R^2$$

and $$R^1R^2R^3P$$

where $R^1$, $R^2$ and $R^3$ are the same or different hydrocarbon radicals of 1 to 8 carbon atoms and $n$ is an integer from 1 to 8;
  (iv) compounds of the formula $$(R^4R^5N)_nSiX_{4-n}$$

where $R^4$ is a hydrocarbon radical of 1 to 8 carbon atoms, $R^5$ is a member selected from hydrogen and hydrocarbon radicals of 1 to 8 carbon atoms, X is a member selected from halogens, hydrogen and hydrocarbon radicals of 1 to 8 carbon atoms and $n$ is a natural number not exceeding 4;

(v) compounds of the formula

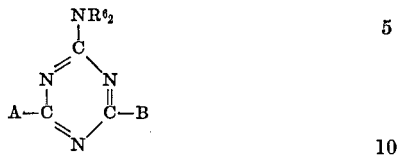

where $R^6$ is an alkyl radical of 1 to 8 carbon atoms, A and B are members selected from the group consisting of alkyl, aryl and aralkyl radicals of 1 to 8 carbon atoms, a dialkylamino group having an alkyl radical of 1 to 8 carbon atoms, and halogens, A and B being the same or different; and (vi) compounds selected from the group consisting of the compounds of the formulas

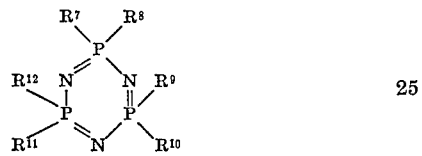

and

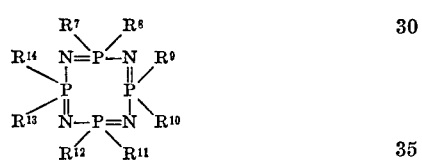

where $R^{7-14}$, are members selected from the group consisting of halogens and $NQ_2$, where Q is a member selected from the group consisting of H and alkyl; the mol ratio of component (3) to component (2) being 0.005–20:1.

3. The process according to claim 1 wherein said transition metal of the principal catalyst is a member selected from the group consisting of titanium, zirconium, vanadium, chromium and molybdenum, and R is a member selected from the group consisting of the lower alkyl, aryl and aralkyl groups.

4. A catalyst composition for polymerizing alpha-olefins, which comprises (1) a compound selected from the group consisting of the halides and oxyhalides of transition metals of Groups IV–A—VI–A of the periodic table, and (2) an organoaluminum compound of the formula

where R is the same or different hydrocarbon radical of 1 to 15 carbon atoms, the mol ratio of component (1) to component (2) being 1:0.05–10.

5. A catalyst composition for polymerizing alpha-olefins, which comprises (1) a compound selected from the group consisting of the halides and oxyhalides of transition metals of Groups IV–A—VI–A of the periodic table, (2) an organoaluminum compound of the formula

where R is the same or different hydrocarbon radical of 1 to 15 carbon atoms, and (3) a promoter selected from (i) compounds selected from the group consisting of the compounds of the formulas $PX_3$ and $POX_3$, where X is halogen;

(ii) compounds selected from the group consisting of the compounds of the formulas $SOX_2$ and $SO_2X_2$, where X is halogen;

(iii) compounds selected from the group consisting of the compounds of the formulas

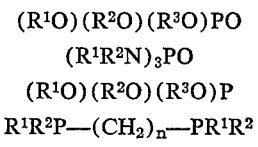

and $R^1R^2R^3P$ where $R^1$, $R^2$ and $R^3$ are the same or different hydrocarbon radicals of 1 to 8 carbon atoms and $n$ is an integer from 1 to 8;

(iv) compounds of the formula

where $R^4$ is a hydrocarbon radical of 1 to 8 carbon atoms, $R^5$ is a member selected from hydrogen and hydrocarbon radicals of 1 to 8 carbon atoms, X is a member selected from halogens, hydrogen and hydrocarbon radicals of 1 to 8 carbon atoms and $n$ is a natural number not exceeding 4;

(v) compounds of the formula

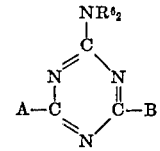

where $R^6$ is an alkyl radical of 1 to 8 carbon atoms, A and B are members selected from the group consisting of alkyl, aryl and aralkyl radicals of 1 to 8 carbon atoms, a dialkylamino group having an alkyl radical of 1 to 8 carbon atoms, and halogens, A and B being the same or different; and (vi) compounds selected from the group consisting of the compounds of the formulas

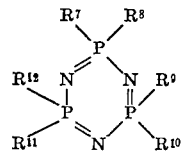

and

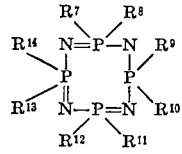

where $R^{7-14}$, are members selected from the group consisting of halogens and $NQ_2$, where Q is a member selected from the group consisting of H and alkyl, the mol ratio of components (1) to (2) being 1:0.05–10 and the mol ratio of component (3) to component (2) being 0.005–20:1.

6. The catalyst composition according to claim 4 wherein said transition metal is a member selected from the group consisting of titanium, zirconium, vanadium, chromium and molybdenum, and R is a member selected from the group consisting of the lower alkyl, aryl and aralkyl groups.

7. The catalyst composition according to claim 5 wherein said transition metal is a member selected from the group consisting of titanium, zirconium, vanadium, chromium and molybdenum, and R is a member selected from the group consisting of the lower alkyl, aryl and aralkyl groups.

References Cited

UNITED STATES PATENTS 2,969,383  1/1961  Petree _____ 260—448
3,400,084  9/1968  Furumato et al.

JOSEPH L. SHOFER, Primary Examiner
EDWARD J. SMITH, Assistant Examiner

U.S. Cl. X.R.

252—429; 260—80.7, 80.78, 85.3, 93.1, 93.5, 94.9, 448